United States Patent [19]
Bruss

[11] 3,987,273
[45] Oct. 19, 1976

[54] SEAM WELDER HEAD

[75] Inventor: Elmer W. Bruss, Milwaukee, Wis.

[73] Assignee: Acro Welder Mfg. Co., Milwaukee, Wis.

[22] Filed: Dec. 12, 1975

[21] Appl. No.: 640,048

[52] U.S. Cl. ................................. 219/84; 219/81; 219/119; 219/120
[51] Int. Cl.² ........................................ B23K 11/06
[58] Field of Search ................ 219/81, 84, 119, 120

[56] References Cited
UNITED STATES PATENTS

| | | | |
|---|---|---|---|
| 1,580,401 | 4/1926 | Borgadt | 219/84 |
| 2,206,747 | 7/1940 | Mirfield | 219/84 X |
| 2,850,620 | 9/1958 | Wenthe | 219/120 |
| 3,731,046 | 5/1973 | Brems | 219/119 X |
| 3,832,516 | 8/1974 | Baker | 219/84 X |

Primary Examiner—J. V. Truhe
Assistant Examiner—N. D. Herkamp
Attorney, Agent, or Firm—Michael, Best & Friedrich

[57] ABSTRACT

The seam welding head has an outer annular electrode connected to the hub by means of a resilient annulus bridged by multiple laminated conductors. The electrode is water cooled. The resilient annulus is stressed as the electrode is moved into contact with the work and provides the follow-up force during the forging phase of the welding cycle. The relatively small weight of the electrode permits fast follow-up without excessive force and permits much faster welding.

6 Claims, 2 Drawing Figures

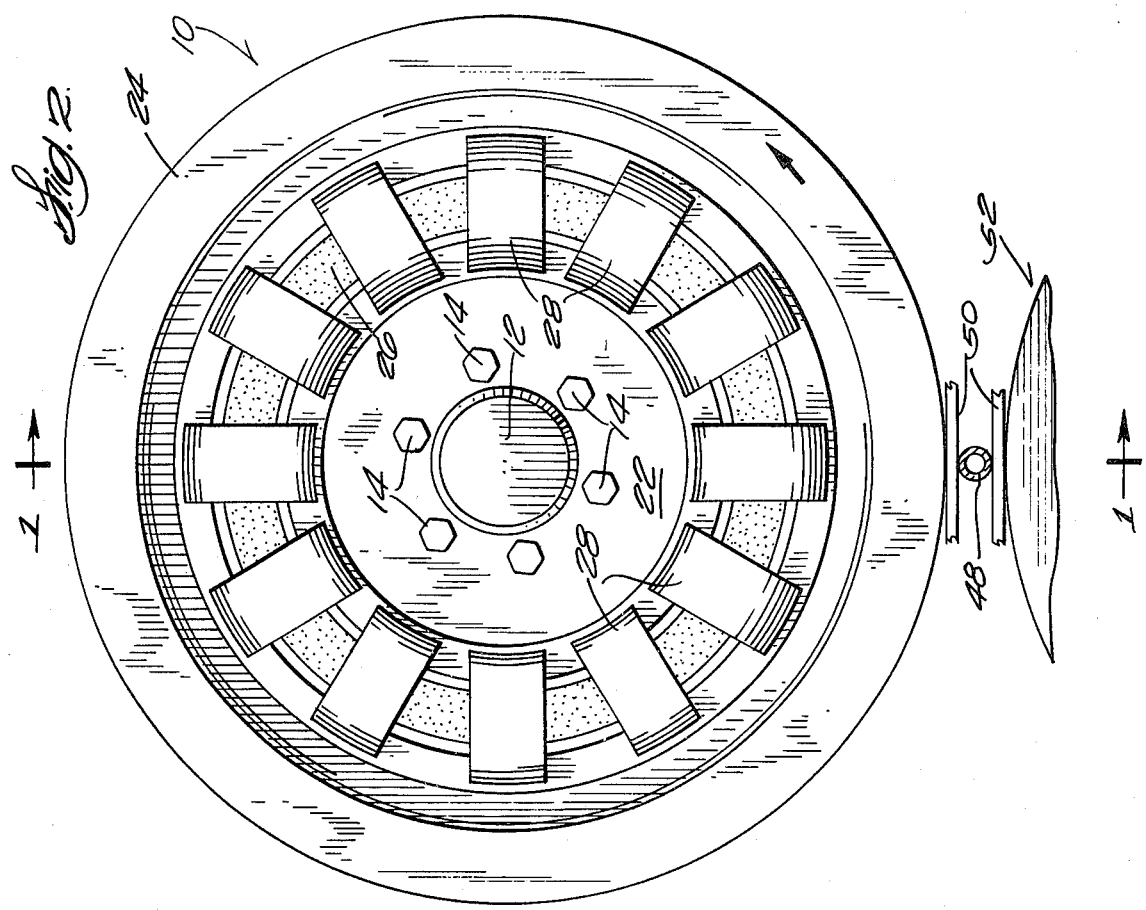
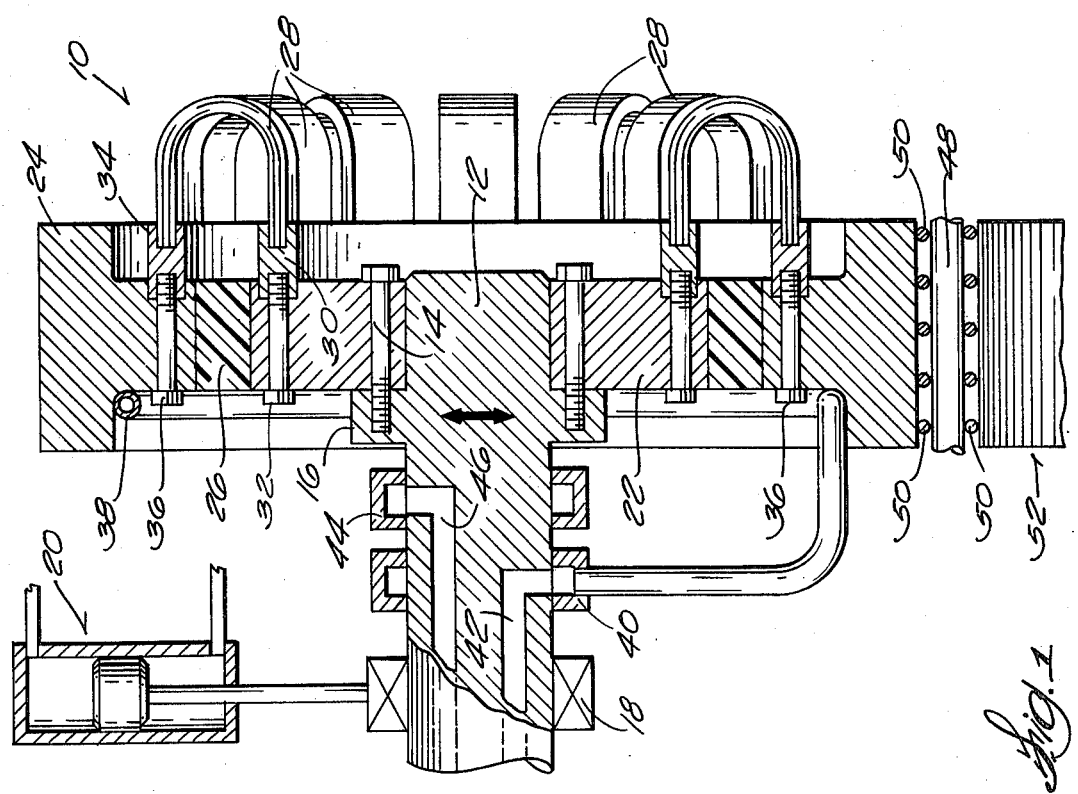

SEAM WELDER HEAD

BACKGROUND OF THE INVENTION

This invention relates to seam welders. Typically these machines have confronting wheel electrodes between which the work passes. One electrode is bodily movable toward the other and must be loaded to develop the desired pressure or load on the work. A critical part of any welding operation is the follow-up as the metal melts — i.e. during the forging part of the weld cycle. The movable electrode wheel assembly includes a ram and bearings and the weight of the assembly becomes appreciable, . . . for example, in two typical machines manufactured by applicant's assignee the assembly weighs 135 Kg and 208 Kg. Considering that the electrode desirably moves 0.25 mm to 0.5 mm during the follow-up phase, the force required to move the assembly in a short weld cycle (½ to 1 cycle of 60 Hz) becomes very high — 27 to 218 Kg in the case of the 135 Kg assembly and 42 to 338 Kg in the case of the 208 Kg assembly (ignoring friction in both cases). And then the electrode assembly must be stopped . . . preferably in one half the follow-up distance which means the work must absorb between 27 and 675 Kg depending upon the assembly and distance involved. With such forces involved the use of seam welders is limited and in some applications results in deformation of the work which is accepted in the interest of economy even though the function of the efficacy of the end product may be adversely affected.

There have been attempts to improve the design of the wheel electrode by providing some resiliency to the electrode wheel. Russell U.S. Pat. No. 2,918,546 shows a spring loaded wheel which can be loaded to a predetermined maximum. While he does not speak of follow-up, there may be some in his design. He uses two springs arranged in such a way that the actual loading obtained is dependent upon the angular position of the wheel. Current is delivered to the wheel through the springs (and the drive gearing) and there is always a question of developing spring harmonics in rapid welding. His arrangement may be satisfactory for very light hand held work as he describes but clearly cannot be applied to heavy duty use simply because the welding current would melt the springs. Caputo U.S. Pat. Nos. 2,205,680 and 2,276,925 disclose a resiliently mounted eccentric wheel for applying the welding current to the work. There is a pressure applying wheel on each side of the electrode wheel. Thus he has increased the mass (weight) by attempting to separate the pressure and current sources. This is obviously counter productive.

SUMMARY OF THE INVENTION

The object of this invention is to improve the follow-up capabilities of a seam welder. This has been accomplished by providing an annular wheel connected to a central hub through a resilient annulus which is bonded to each. Current is supplied to the wheel through flexible conductors and the wheel is water cooled to prevent heating the resilient annulus to the point where the bond would fail. The resilient annulus permits initially loading the wheel to the desired extent and, by reason of the stored energy in the annulus, provides the follow-up force. The mass to be accelerated is greatly reduced — on a basis comparable to the above prior art examples one form weighs 6.8 Kg (cf 135 Kg) and the other is 13.6 Kg (cf 208 Kg). The forces required during follow-up (again on a comparable basis) range from 1.4 to 11 Kg for the 6.8 Kg wheel (cf 27–218 Kg) and 2.75 to 22 Kg for the 13.6 Kg wheel (cf 42–338 Kg). These forces are easily obtained from the stressed resilient annulus. Much more so than with a ram arrangement as in the prior art. The preload need not be so great as to crush delicate parts and yet the follow-up is fast enough to permit welding in ½ to 1 cycle of 60 Hz current.

In what may be termed straight seam welding, this invention permits welding two to three times as fast (on a linear basis). In another type of welding where wire is welded to tubular coils to make condensers for refrigerators the prior art required step progression of the work through the machine and the machine frequently partly collapsed the tubes, missed some welds, and resulted in considerable spitting. With the present welding head the work progresses through the machine with continuous motion, no tubes are deformed, and production is increased to the point that one of the new machines is expected to replace seven prior art machines. The ability of this head to weld without crushing tubes has suggested application of seam welding to many products heretofore made by other more costly methods.

The resilient annulus is preferably made of polyurethane with the durometer selected to achieve the desired performance. Thus far there is no apparent formula or rule of thumb evident for this selection. The configuration of the wheel (and principally the perimeter) is dependent upon the width of the weld to be made. The diameter is a function of the area to be covered by a single weld cycle. In practice many of these aspects of the design become self-evident while experience dictates reasonable starting points in selection of the polyurethane characteristics.

DESCRIPTION OF THE DRAWINGS

In lieu of illustrating a complete welding machine certain portions of the drawings are depicted in schematic form to simplify the disclosure. These portions primarily relate to the cooling water system, the bearings for the shaft, and the ram arrangement for moving the upper welding head relative to the lower head.

FIG. 1 is a vertical section taken on line 1—1 of FIG. 2.

FIG. 2 is a front elevation of the welding head.

In both FIGS. 1 and 2 the lower welding head is shown in part only.

DESCRIPTION OF THE PREFERRED EMBODIMENT

The upper welding head 10 is connected to shaft 12 by bolts 14 passing through the head into the collar 16 on the shaft 12. Various quick disconnect arrangements can also be utilized and the method of connecting the head to the shaft is relatively unimportant. Shaft 12 is rotatably mounted in bearings schematically illustrated at 18 and the entire shaft support system is vertically movable to and from the work by the ram 20. Shaft 12 is rotatably driven to rotate head 10.

The hub section 22 of the head 10 is solid copper as is the rim or electrode 24. The electrode is connected to the hub by polyurethane annulus 26 which is bonded to the rim and to the hub. The hub is electrically connected to the rim by a multiplicity of flexible conductors 28. Each conductor is made up of a multiplicity of thin copper laminations (for example, in one form each conductor is made of 70 laminations each 0.127 mm thick) which give each conductor its flexible characteristics. The ends of each conductor closest to the centerline are fixed in a copper ring 30 which is retained in the hub by bolts 32 while the outer ends of the conductors are anchored in ring 34 connected to the rim by bolts 36. In the illustrated design there are 12 conductors or jumpers. The general approach in selecting the number of conductors is to employ as many as is reasonable given the size of the wheel assembly. The ultimate objective is to have the electrical path to the part of the wheel in contact with the work remain relatively constant. If too few conductors are utilized, the transformer cannot handle the changing inductance and satisfactory welding cannot be accomplished. With reasonably constant inductance the welding temperature for each successive weld remains essentially the same and quality is uniform.

Considerable heat is, of course, generated in the seam welding operation and this heat, if not dissipated, would overheat the bond and the urethane with the bond being more subject to heat destruction than the urethane itself. Therefore, provision is made for cooling rim or electrode 24. For this purpose the water cooling tube 38 is brazed into the corner of the rim as illustrated and one end is brought out to a slip-type connection 40 receiving water provided through conduit 42 in shaft 12 while the return flow is provided through a slip joint 44 communicating with return conduit 46 in the shaft 12. This permits a supply of cooling water to be provided to the cooling tube 38 to keep the temperature of the rim within reasonable limits.

For illustrative purposes the work is shown as being the condenser-type assembly referred to in the Summary of the Invention above. Here the refrigerant tube 48 is to have wires 50 welded to each side of the tube for the purpose of dissipating heat in the refrigeration cycle. Accordingly, the rim in this instance has a rather wide face so as to contact a number of wires at the same time. The upper head 10 is moved by ram 20 down into contact with the work which is now backed up by lower head 52 which is similar in all respects to the upper head but which need not be mounted for linear movement, i.e. it need only be rotatably mounted and does not need a ram assembly. The shape of the rim is dictated by the nature of the weld to be made — if a narrow seam is to be welded the rim will be much more narrow than the illustrated form which is designed to cover a larger area.

As the upper head is brought into contact with the work and the pressure is increased, the polyurethane annulus is stressed. The portion closest to the work is, of course, compressed while the portion diametrically opposed to that compressed section is in tension while the portions at 90° to that axis are placed in shear. The degree of compression applied by the ram, of course, determines the degree of stress placed into the polyurethane annulus. The energy stored in the polyurethane is now available for release to provide the follow-up force as the welding energy melts the metal and the head is required to move up rapidly to achieve the forging phase of the welding cycle. If will be appreciated that the provision of the resilient annulus 26 effectively divorces the electrode or rim 24 from the other mass of the welding head assembly, i.e. the rim is free to move relative to the hub and the shaft and its bearings and the ram assembly. Therefore, there is only the relatively light-weight rim to be moved and consequently the force requirements are considerably reduced and the attainment of rapid follow-up is feasible. The necessary follow-up forces are considerably less than in the conventional seam welding machine and the energy is stored in the annulus. There is less destructive pressure applied to the work and the welding head permits greater welding speed without partial or complete destruction of the work. Operating on 60 Hz voltage supply, each half cycle (8 milliseconds) can become a spot weld which can be forged because the low mass permits extremely fast follow-up without excessively high forces. The rim or electrode, in effect, dances on the work (albeit a motion within the range of 0.25 to 0.5 mm). The design permits maintaining a positive current connection to the workpieces and more consistent forging action during the welding cycle. There is less weld spitting than in the prior art and there is less cold deformation after the weld current is turned off simply because the relatively low inertia can be absorbed by the work without destruction. This is to be compared with the considerable inertia in the prior designs and then the problem of stopping that mass, i.e. absorbing the energy in the work.

I claim:
1. A seam welding head comprising
   an electrically conductive hub,
   an electrically conductive integral annular electrode co-axial with and spaced from the hub,
   a resilient annulus in the space between the electrode and the hub,
   said annulus being bonded to the electrode and the hub and serving to position the electrode radially and axially relative to the hub.,
   and flexible conductor means connecting the hub and the electrode.
2. A seam welding head according to claim 1 in which the annulus is made of polyurethane.
3. A seam welding head according to claim 1 including means for cooling the electrode.
4. A seam welding head according to claim 1 in which said conductor means comprise multiple conductors angularly spaced about the hub so that inductance between the hub and any point on the periphery of the electrode remains generally uniform,
   each of the conductors being made of multiple laminations permitting the electrode to move relative to the hub.
5. A seam welding head according to claim 4 including means for cooling the electrode.
6. A seam welding machine having two heads according to claim 1, each head being rotatably mounted and one head being linearly movable to and from the other to sandwich the work to be welded between the heads, the annulus in each head being stressed during welding operations.

* * * * *